US009367837B2

(12) United States Patent
Martin et al.

(10) Patent No.: US 9,367,837 B2
(45) Date of Patent: Jun. 14, 2016

(54) CASH AND/OR FINANCIAL DOCUMENT HANDLING SYSTEM

(71) Applicant: Talaris Limited, Basingstoke (GB)

(72) Inventors: Olivier Martin, Auvernier (CH); Douglas Jay Wielard, Lisle, IL (US); Michael Eugene Bielamowicz, Napperville, IL (US); Bryan James Christophersen, Fareham (GB); James William Long, St. Helens (GB); Stefan Albert, Frankfurt am Main (DE)

(73) Assignee: GLORY GLOBAL SOLUTIONS (INTERNATIONAL) LIMITED, Basingstoke, Hampshire (GB)

( * ) Notice: Subject to any disclaimer, the term of this patent is extended or adjusted under 35 U.S.C. 154(b) by 34 days.

(21) Appl. No.: 13/851,408

(22) Filed: Mar. 27, 2013

(65) Prior Publication Data

US 2014/0297526 A1 Oct. 2, 2014

(51) Int. Cl.
*G06Q 40/00* (2012.01)
*G06Q 20/10* (2012.01)
*G07F 19/00* (2006.01)

(52) U.S. Cl.
CPC .......... *G06Q 20/1085* (2013.01); *G07F 19/211* (2013.01)

(58) Field of Classification Search
CPC . G06Q 20/1085; G06Q 20/18; G06Q 20/108; G06Q 40/02; G07F 19/20; G07F 19/211; G07F 19/206; G07F 19/00; G07F 19/202; G07F 19/203; G07F 19/209
USPC .......................................... 705/43, 35, 45, 42
See application file for complete search history.

(56) References Cited

U.S. PATENT DOCUMENTS 5,250,788 A * 10/1993 Sugai ........................ G07D 7/00
235/379
6,983,836 B2 * 1/2006 Adams ..................... G07D 3/00
194/302

(Continued)

FOREIGN PATENT DOCUMENTS

EP          1 783 676 A1    5/2007
WO      WO 02/09001 A1    1/2002
WO    WO 2013/102654 A1  7/2013

OTHER PUBLICATIONS

Compuflex WinUCM, archived from Wayback machine dated Jan. 24, 2011.*

(Continued)

*Primary Examiner* — Stephanie M Ziegle
*Assistant Examiner* — Michael W Anderson
(74) *Attorney, Agent, or Firm* — Renner, Kenner, Grieve, Bobak, Taylor & Weber

(57) ABSTRACT

A controller comprising: a database; a control module associated with the database; and a network interface configured to connect, over a network, to a plurality of workstations and at least one machine for performing operations to handle cash and/or other physical financial documents. The network interface receives requests from at least some of the workstations over the network, each comprising a request to pre-order a respective one of the operations. The requests are stored in the database. The network further receives, over the network, a signal from or on behalf of a slave module of the machine for retrieving one of the requests from the database. The control module processes the signal and in response releases the respective operation, the release comprising issuing an instruction to the slave module over the network controlling the machine to perform the respective operation to handle the cash and/or other physical financial document.

20 Claims, 3 Drawing Sheets

(56) References Cited

U.S. PATENT DOCUMENTS

| | | | | |
|---|---|---|---|---|
| 7,350,699 | B2* | 4/2008 | Gunst | G07D 11/0018 235/379 |
| 7,522,880 | B2* | 4/2009 | Stieber et al. | 455/41.2 |
| 7,857,206 | B2* | 12/2010 | Gunst | G07D 11/0018 235/379 |
| 8,181,854 | B1* | 5/2012 | Folk et al. | 235/379 |
| 8,229,816 | B1* | 7/2012 | Mattison | G06Q 20/10 194/200 |
| 2004/0215566 | A1 | 10/2004 | Meurer | |
| 2007/0158407 | A1 | 7/2007 | Gunst et al. | |
| 2007/0181676 | A1* | 8/2007 | Mateen | G06Q 20/04 235/381 |
| 2010/0174640 | A1 | 7/2010 | Cole et al. | |
| 2011/0106681 | A1* | 5/2011 | Cockerell | G06Q 10/06 705/35 |
| 2011/0288999 | A1* | 11/2011 | McGraw et al. | 705/44 |
| 2011/0313924 | A1 | 12/2011 | Carell et al. | |

OTHER PUBLICATIONS

Software Port Number. Wikipedia Webpage, Feb. 3, 2007. http://web.archive.org/web/20070203121432/http://en.wikipedia.org/wiki/List_of_TCP_and_UDP_port_numbers.*

Compuflex WinUCM, archived from Wayback machine dated Jan. 24, 2011. http://web.archive.org/web/20110124223729/http://compuflexcorp.com/wp-content/themes/compuflex/documents/WinUCM.pdf.*

British Search Report (Application No. GB1309676.3) (3 pages—dated Dec. 3, 2013).

PCT Search Report (International Application No. PCT/EP2014/056223) (9 pages dated Jul. 4, 2014).

* cited by examiner

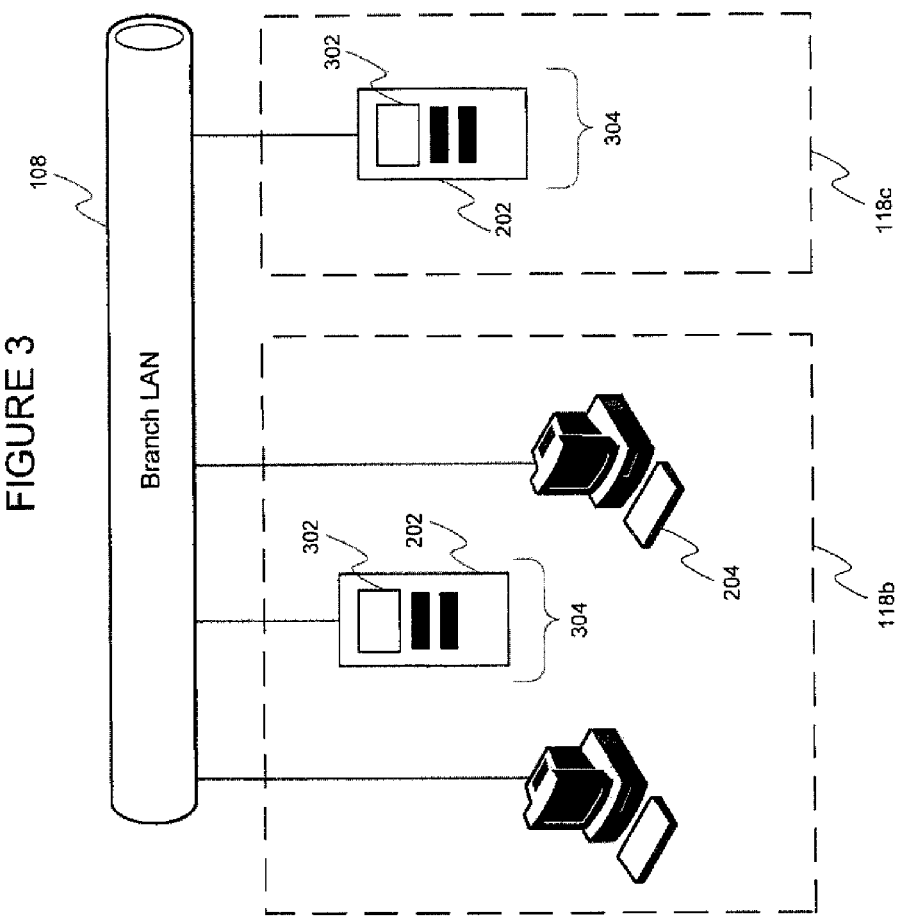
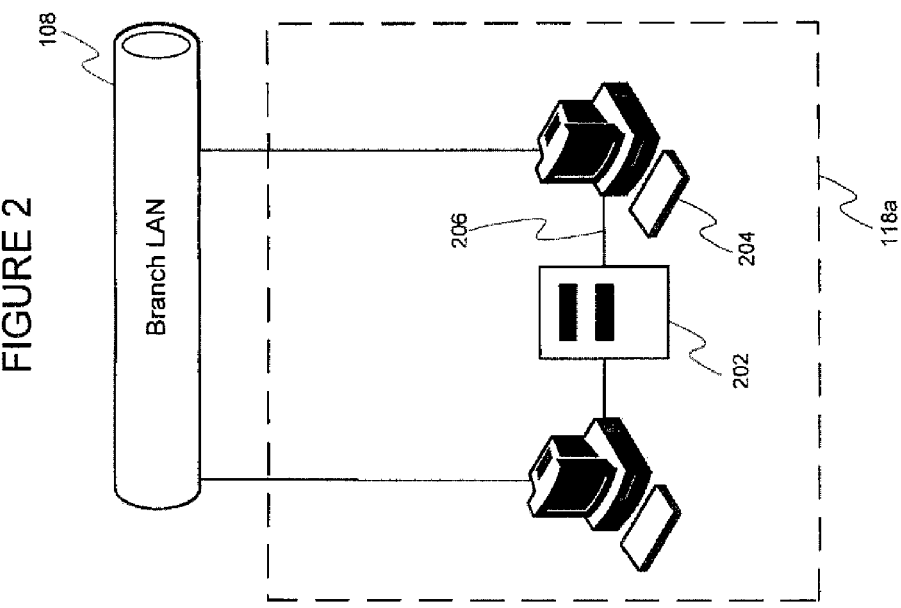

CASH AND/OR FINANCIAL DOCUMENT HANDLING SYSTEM

FIELD OF THE INVENTION

The present invention relates to a system comprising at least one machine for handling cash and/or other physical financial documents in a mechanical manner. The system may find a use in a banking environment, e.g. in one or more branches or outlets of a retail bank.

BACKGROUND

In a conventional branch of a bank, each teller has a workstation connected to a machine for dispensing, accepting or recycling physical tokens of monetary value ("cash"), typically in the form of bank notes and/or coins. Such a machine may be referred to as a teller cash dispenser (TCD), teller cash acceptor (TCA) or teller cash recycler (TCR), the latter being able to both dispense and accept cash and tore-dispense accepted cash to other customers. Each machine is a peripheral connected to only one or perhaps two teller workstations, each connection being a dedicated, one-to-one physical connection in the form of a cable such as a serial cable.

Each teller's workstation may also be separately connected to a core bank system via a network of the branch. The core system is where the data of the customers' bank accounts are held. To process a transaction such as dispensing cash, the teller may use a dual keyed model whereby he or she first uses the workstation to key in the transaction from the workstation to the core network, and if the core network approves the transaction it returns an approval to the teller's work station. The teller then uses the workstation to separately key in the same transaction from the workstation into the peripheral cash-handling machine in order for the workstation to control the machine to complete the transaction. This way the cash-handling machine is kept isolated from the wider network. Alternatives to the dual keyed model include screen scraping, graph integration or full integration.

Traditionally, a given cash-handling machine such as a TCR is rarely shared between more than two tellers. For example, it is important to know whose cash is being dispensed. To that end only one teller should be able to cause the machine to dispense cash at any one time. In the case of one workstation per machine this is relatively straightforward. In the case of two, if the cash-handling machine does receive a transaction request from the connection with the workstation of teller A while cash is currently being dispensed to the other teller B, the cash-handling machine will block the request and return a message to A's workstation saying the machine is busy.

SUMMARY

Going forward, cash-handling machines may be provided with more and more features. For example a TCR may be equipped with its own network port enabling it to become a network-addressable device in its own right rather than a peripheral of a work station. Further, the TCR may be equipped with its own user interface, e.g. comprising a sizable built-in screen or touch screen. With such features comes the potential for additional functionality like access to diagnostic information or the ability to view inventory remotely.

Another desirable addition to the functionality would be to provide additional points from which cash handling operations can be ordered, other than just an adjacent teller workstation of the conventional teller workstation model. For example, a user could directly operate a cash-handling machine to dispense cash using a built-in user interface, or could use a remote workstation to pre-order cash from the machine over the network (to be dispensed from the machine for collection at a later time).

According to one aspect of the present invention, there is provided a controller comprising: a database; a control module associated with the database; and a network interface configured to connect, over a network, to a plurality of workstations and at least one machine for performing operations to handle cash and/or other physical financial documents. The network interface is configured to receive requests from at least some of said plurality of workstations over the network, each comprising a request to pre-order a respective one of said operations. The database is configured to store said requests. The network interface is further configured to receive, over the network, a signal from or on behalf of a slave module of the machine for retrieving one of said requests from the database. The control module is configured to process the signal and in response to release the respective operation, the release comprising issuing an instruction to the slave module over the network controlling the machine to perform the respective operation to handle the cash and/or other physical financial document.

For instance, in embodiments the machine is a cash-handling machine and each of said operations comprises a cash-handling operation for accepting or dispensing cash, the instruction to the slave module controlling the cash-handling machine to dispense or accept cash in accordance with the respective cash-handling operation.

Thus requests for cash-handling operations or the like are stored at a database of a central controller and released in dependence on instruction from the central controller (as opposed to the cash-handling machine or any given workstation behaving autonomously). This provides greater scope for requests to be submitted from any of multiple workstations, and to be retrieved from a cash-handling machine which need not necessarily be immediately connected to or co-located with the workstation from which any given transaction was requested. The conventional model whereby a request spontaneously initiates a transaction from an immediate machine is done away with. The user no longer expects a request to be serviced spontaneously, but rather he or she expects it to be stored for processing at the discretion of the controller.

For example, it may be important to know whose money is being dispensed—a new operation dispensing cash should not be allowed to begin until another has finished—but this becomes more of an issue as the number of points from which a transaction can be requested increases. If an operation to dispense cash can be requested and/or initiated from multiple different points (potentially including remote points), there is increased potential for conflict. Requests could made by any of tellers A, B, C, D, etc. or other users, without there necessarily being any cooperation between them. For example a request sent from an adjacent workstation may try to cause the cash-handling machine to dispense cash at the same time as a request submitted by a built-in user interface of the machine is being serviced, or vice versa; or one user may attempt to retrieve pre-ordered request while the machine is still dispensing the cash requested by another user. Also, the TCR no longer necessarily just sits behind a desk between two adjacent co-workers who coordinate their activity by interacting personally with one another. Similar points may be made where the machine is accepting cash.

In embodiments of the present invention, as the stored requests are only released in they pass a conflict resolution, there is avoided a situation where two (or more) different tellers or other users might cause different transactions to proceed simultaneously, e.g. both try to dispense cash at once or both try to deposit cash at once.

According to further aspects of the present invention, there are provided corresponding systems, methods of controlling a cash and/or document handling machine, and corresponding computer program products comprising code embodied on a computer-readable storage medium.

BRIEF DESCRIPTION OF THE DRAWINGS

For a better understanding of embodiments of the present invention and to show how they may be put into effect, reference is made to the accompanying drawings in which:

FIG. 2 is a schematic diagram of teller equipment,
FIG. 3 is a schematic diagram of further teller equipment.

DETAILED DESCRIPTION OF PREFERRED EMBODIMENTS

Figure 1:
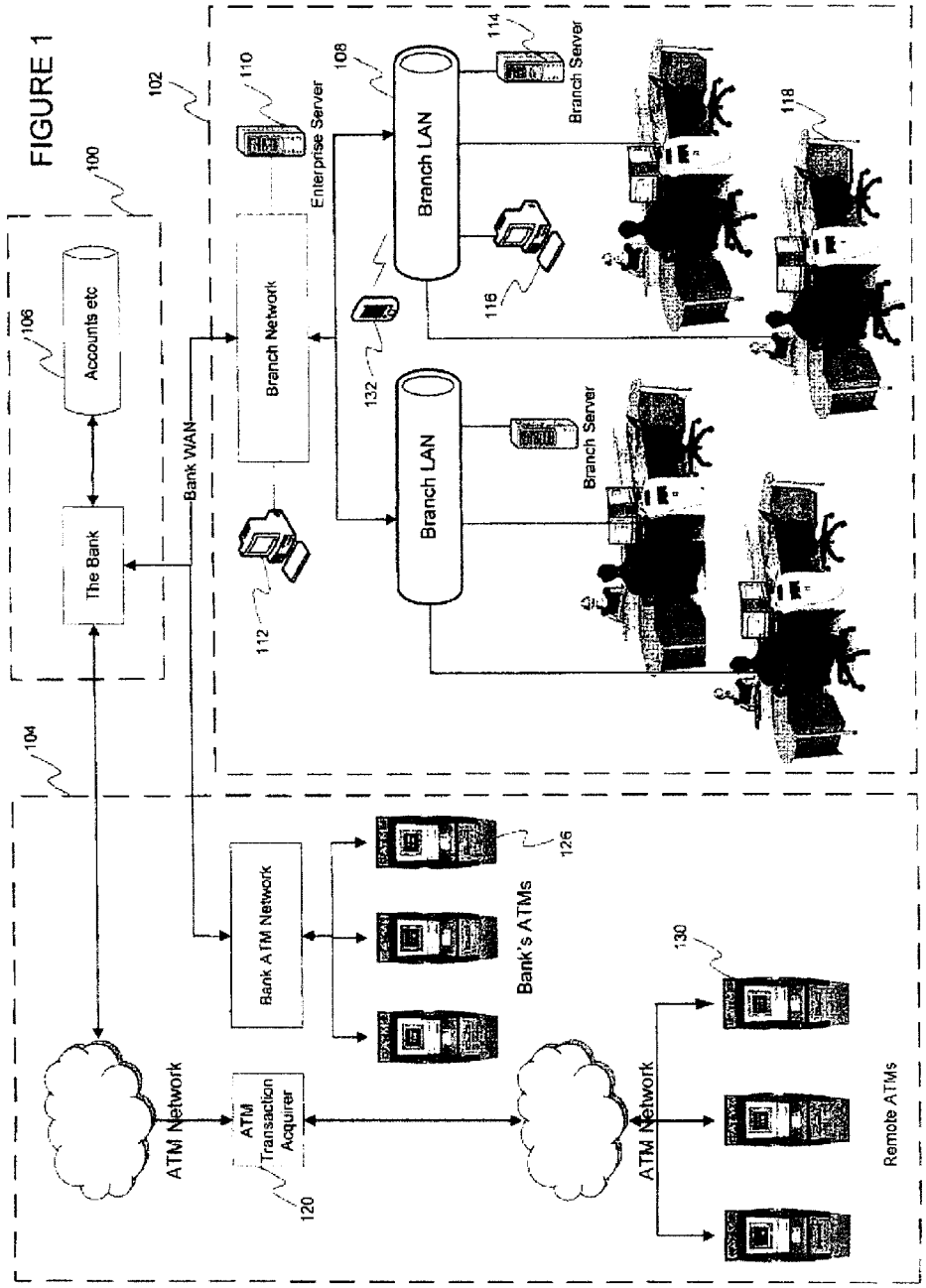
FIG. 1 is a schematic diagram of a banking environment.

FIG. 1 provides a schematised illustration of a banking environment. This comprises a core system 100 of the bank, a branch banking network 102, and an ATM network 104. The core system 100 comprises a database 106 which is where the records for all the customers of the bank are stored, including the account data for each customer defining the monetary value of the account and potentially other factors such as a credit or overdraft limit. Any transaction such as those involving dispensing cash to a customer, accepting deposit of cash from a customer, transferring funds between accounts or loaning funds to a customer's account must be cleared by the core system 100 and recorded in the database 106 of the core system 100.

The branch banking network 102 is connected to the core system 100 by a wide area network (WAN) of the bank. The branch banking network 102 is the part of the banking environment relating to the interaction between branch staff and customers. Within the branch banking network 102 for the whole bank enterprise, each individual branch comprises a respective local area network (LAN) 108. Each branch's LAN 108 comprises a branch server 114 and teller equipment 118 for one or more tellers.

FIGS. 2 and 3 give schematic block diagrams showing examples of teller equipment 118. The teller equipment 118 comprises one or more cash-handling machines 202, e.g. in the form of a teller cash dispenser (TCD), teller cash acceptor (TCA) and/or teller cash recycler (TCR). Each cash-handling machine 202 comprises a secure cash box and a mechanism for dispensing and/or accepting cash. Cash handling refers to the accepting, dispensing, recycling or other processing of tangible, physical tokens of monetary value, typically tokens issued by governments such as coins and bank notes.

It is also possible to provide cash-handling machines equipped with additional capability of accepting, dispensing, recycling or processing other physical documents such as: cheques, bills, invoices, debit forms, account transfer forms and/or bank passbooks; and/or deposit slips, payments documents, savings withdrawal tickets, cheque deposit slips, savings deposit slips, and/or other documents used as proof of deposit at a financial institution. For instance, a cash-handling machine may comprise a mechanism, sensor and image recognition software for processing cheques or settling bills or invoices in an at least partially automated manner. Further, it is also possible to provide dedicated document handling machines for accepting, dispensing, recycling or processing such physical documents but not necessarily coins or notes. Physical or tangible here excludes pure electronic documents, so excluding documents existing purely in the form of data on a computer (though they may be represented in electronic form at some stage in the processing). Typically these physical documents are paper documents, but could also include plastic documents for example. The following will be discussed in terms of cash-handling machines, but it will be understood that a cash-handling machine may have other document handling functionality, and/or that the teachings may be applied to other kinds of machines for handling financial documents.

It will be appreciated these kinds of cash or document handling machines are suitable for use in a retail banking environment, in which a financial institution provides an interaction between staff and consumers. Typically this interaction is provided via a "high street" style presence or the like, and may be provided either from one of the institution's own branches or the commercial outlet of a partner or representative. Note that while it may be said the institution as a whole provides an interaction with the consumer, it may nonetheless comprise staff or other aspects that do not directly interact with the consumer, e.g. a supervisor or technician does not necessary interact with customers, or a drop-box may be used by a customer to deposit cash or cheques, etc.

FIG. 2 shows a more traditional arrangement 118a for the teller equipment 118, where the cash-handling machine 202 comprises a conventional TCD, TCA or TCR without its own user interface. In this case the user interface is provided by a separate terminal in the form of a teller workstation 204. In the traditional set-up each cash-handling machine 202 is connected to only one or at most two teller workstations 204, and is strictly a peripheral of its one or two respective work stations 204, each connection being a direct, dedicated, one-to-one physical connection 206 in the form of a cable such as a serial cable. The cash-handling machine is not connected to any other part of the network 102, 100 by any other connection and is strictly isolated from the wider network 102, 100.

FIG. 3 shows an alternative arrangement 118b and/or 118c for the teller equipment 118, which shifts away from the workstation centric model of FIG. 2 towards a more branch-wide or even enterprise-wide model. In this case each cash-handling machine 202 comprises a network port connecting directly onto the branch LAN 108 without necessarily having to be connected immediately to a teller workstation 204. The cash-handling machine 202 is now a network addressable device rather than a peripheral of a workstation 204, the machine 202 having its own network address and being configured to communicate according to a suitable network protocol such as TCP-IP.

In one such arrangement 118b, the teller workstation 204 may still be located physically adjacent to the machine 202 in the branch (e.g. behind the teller's desk), but is now arranged to communicate with the cash-handling machine 202 via the branch LAN 108 in order to conduct transactions such as dispensing and/or accepting cash.

Further, in embodiments the cash handling machine 202 may be integrated into the same terminal (same housing) as a built-in user interface 302 allowing it to be operated directly by a teller or other bank staff. For example the user interface 302 may take the form of a touch screen or screen plus one or more other user input devices. The cash-handling machine 202 and built-in user interface 302 together provide an integrated workstation 304 from which functionality of the cash-handling machine 202 and the LAN 108 or wider network 102 may be accessed.

The branch LAN 108 may also comprise one or more further branch workstations 116 being terminals other than a teller workstation 204, not immediately located next to a cash-handling machine 202. For instance this may be a supervisor's terminal, a terminal of a manager's office or a terminal in a separate client meeting room. In the network model, a further branch workstation 116 like this may also be enabled to access functionality of the cash-handling machines 202 via the LAN 108. Similarly, connected to the wider branch banking network 102 but not necessarily associated with any single branch, the branch banking network 102 may further comprise one or more terminals 112 such as a terminal of a regional manager's office or a headquarters.

In another example arrangement 118c, the cash-handling machine 202 takes the form of a teller-assisted machine, which is another example of an integrated workstation 304 having its own user interface 302 integrated into the same terminal (in the same housing). In this case it allows the cash-handling machine 202 to be operated directly by a customer and teller or other member of bank staff. A teller assisted machine is a partially (but not fully) self-service workstation. The customer can initiate or perform part of a transaction him or herself, but a teller is still available on the branch floor to assist in the transaction. Again in embodiments, some or all of the software may be hosted on a server 110 or 114, but this time accessed via a complementary application running on the teller assisted machine 118c itself rather than a separate workstation 204.

In another example, a mobile user terminal 132 such as a smart phone, tablet or laptop may be installed with a suitable application enabling it to act as a mobile workstation. In this case the mobile terminal 132 is able to access some functionality of the system via a suitable wireless connection with the LAN 108 or wider network 102, e.g. to access inventory or diagnostic information.

Thus the network model opens up the possibility of various different kinds of workstation 112, 116, 118c, 204, 304 being able to access the functionality of a cash-handling machine 202 having its own address on the LAN 108 or wider network 102. Further, depending on the type of workstation, the user may be a teller, another member of bank staff such as a supervisor, or a customer where the customer may optionally be assisted by a member of bank staff.

The ATM network 104 is a separate, distinct system to the branch banking network 102. The ATM network 104 comprises a plurality of ATMs (automatic teller machines) 126 of the bank, and a plurality of ATMs 130 of one or more other banks.

Even in the case where the teller equipment 118 takes the form of a teller assisted machine 118c, this is not an ATM. Firstly, the teller equipment 118 is equipment that involves an interaction between a member of bank staff (a human teller) and the customer, and is not entirely self-service. A teller assisted machine could sometimes operate in a self-service manner, but the customer has the alternative option of requesting teller assistance to initiate and/or complete a transaction. Secondly, any transaction performed through the branch banking network relates to an account with that particular bank, i.e. that particular enterprise. In contrast, a user does not need to have an account with a given bank to use the ATM of that bank. To this end the ATM network 104 comprises an ATM transaction acquirer 120 to couple between the core network 100 of the bank and the core network(s) of the one or more other banks, and is arranged to perform the relevant interaction to dispense cash from the ATM of one enterprise and deduct from the account of another enterprise. On the other hand, an ATM cannot reach other accounts than that of the customer operating it (typically only the account associated with the card with which the ATM is presented), whereas a teller assisted machine would allow some operators like a teller or supervisor to access many different accounts of other users (multiple customers' accounts). Further, a teller assisted machine is a machine that is not on the ATM network. The branch banking network 102 and ATM network 104 operate on different protocols.

A cash-handling system in accordance with embodiments of the present invention will now be discussed in relation to FIG. 4

The built-in user interface 302 makes a difference because otherwise a user can only interact with the cash-handling machine via a teller application on a workstation 204 connected to it. For example the built-in user interface 302 may comprise a sizable display or touch screen, perhaps 7 inches (15 cm) diagonally which is sufficient to show a graphical user interface. Similarly the network 108 and/or 102 provides an additional way to interact with the machine 202. For example, these features may provide greater visibility of inventory (how much cash is in which cash-handling machines 202) or be used to access diagnostic or other maintenance related information, either from the user interface or remotely over the network.

However, it would be desirable to provide further modification so that the built-in user interface 203 and/or network 108 or 102 can be used to cause the machine 202 to dispense or accept cash (or the like).

Figure 4:
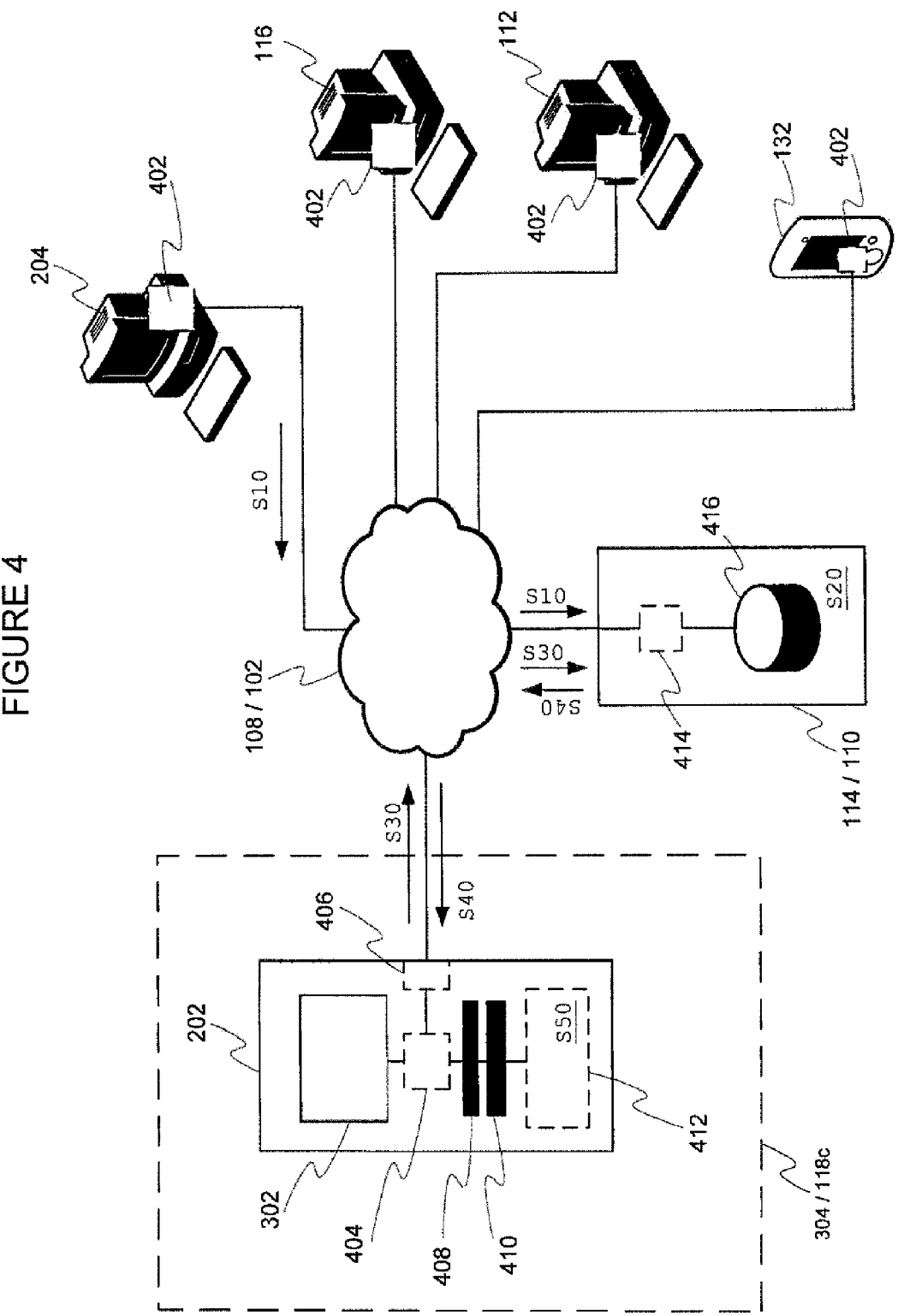
FIG. 4 is a schematic diagram of a cash-handling system.

Accordingly, embodiments of the present invention provide a system as illustrated for example in FIG. 4, which stores orders from various different workstations at a database of a central controller, and releases those orders on instruction from the central controller.

As mentioned, conventionally an operation to accept or dispense cash is initiated immediately from an adjacent teller workstation 204. If users are allowed to order cash from multiple different points of access, or points of access other than a teller workstation 204 immediately connected to the machine 202 and adjacent to it, then there is also now a potential for conflict between the orders. Particularly, there is potential that two (or more) tellers or other users try to cause a transaction to dispense cash at the same time, or to dispense cash at the same time, in which case it may not be known whose cash is being dispensed at any given time. To prevent such conflicts, attempts to cause simultaneous transactions should be prevented. To address this, in embodiments the central controller conditionally releases the orderson condition of clearing a conflict resolution between different demands on the resources of a given cash-handling machine 202. Thus a condition is imposed that one note movement operation must finish before another can start.

The system comprises one or more cash-handling machines 202 and one or more of these may each be housed within a respective integrated workstation 304 with built-in user interface 302, e.g. built-in touchscreen with graphical user interface. In embodiments this integrated workstation may take the form of a teller assisted machine 118c for use in a partially self-service manner by a customer, or alternatively an integrated teller workstation for use only by a teller or other member of bank staff (e.g. behind the counter, in a non-public room or elsewhere away from the public branch floor).

Each of the one or more cash-handling machines 202 comprises a secure cash box 412 comprising a mechanism for dispensing cash via a cash dispensing orifice 410 and/or accepting cash through a cash accepting orifice 408. Each also comprises a network port 406 connecting to one of the branch LANs 108, and a slave module 404 arranged to operate the mechanism of the cash box 412 to accept and/or dispense cash. The slave module 404 may be implemented as a portion of code stored on a storage device of the cash-handling machine 202 and arranged for execution on a processor of the cash-handling machine 202.

The system also comprises a server such as one of the branch servers 114 or the enterprise server 110, comprising a network interface in the form of one or more ports for connecting to the branch LAN 108 or wider branch banking network 102. The server 110 or 114 is configured to act as a controller and comprises management control module 414 and a database 416. The control module 414 is configured to act as the master to the one or more slave modules 404 on the respective one or more cash-handling machines 202, and comprises a driver for operating the mechanism(s) of the one or more cash-handling machines 202. The slave module 404 may be configured to operate the cash box 412 to dispense and/or accept cash only on instruction from the control module 414.

The control module 414 may comprise a portion of code stored on the server 110 or 114 and arranged for execution on a processor of the server. In embodiments the server is located in the branch banking network 102 as opposed to the core system 100. The following will be described in terms of a branch server 114 connected to the same branch LAN 108 as one or more cash-handling machines 202 that it is arranged to serve, but it will be appreciated the teachings can be extended more widely to an enterprise server 110 arranged to serve one more cash-handling machines 202 of one or more branches. Note that the server may comprise one or more server units at one or more physical or geographic locations, and the control module 414 and/or database 416 may be implemented on one unit or in a distributed fashion. Note also that database is not intended to imply any particular size of data store and could cover any size from only a few entries to an enterprise-wide system.

The system further comprises a plurality of workstations 112, 116, 118c, 204 and/or 304. Each workstation comprises a network port connecting to one of the branch LANs 108 or the wider branch banking network 102. Each also comprises a service function 402 for accepting a user input specifying a cash-handling operation, and for submitting a request for the cash-handling operation to the control module 414 on the server 114 via the network 108 and/or 102. The service function may comprise a portion of code stored on a storage device of the respective workstation and arranged to be executed on the respective workstation.

In operation, at step S10 the service function 402 on one of the workstations 112, 116, 118c, 204 or 304 receives a user input requesting a cash-handling operation. In response to this, it submits the request to the control module 414 on the server 110 via the network 108 and/or 102.

In some embodiments the request may specify which cash-handling machine 202 the operation is requested from, i.e. which machine 202 the cash is to be collected from or deposited into. Alternatively for some requests a particular machine 202 need not necessarily be specified, and the system may allow the option of collecting or depositing cash at any of a plurality of cash-handling machines 202, e.g. depending on where a customer happens to be at the time.

The request may specific a particular currency. In embodiments, the request may specify one or more particular denominations of coin or note, or put a condition on the denominations (e.g. nothing larger than a certain denomination, or nothing smaller). In embodiments the user may only specify a total amount and the service function 402 on the respective workstations 112, 116, 118c, 204 or 304 formulates the requested denominations. This may be referred to as a note reservation. Alternatively the denomination need not be specified.

In further embodiments, the requested operation may comprise a multi-stage operation comprising multiple sub-operations, e.g. to dispense and/or accept multiple distinct portions of cash (e.g. a teller depositing or dispensing cash for different customers).

The request also comprises an identification of the user initiating the request. This comprises one or more personal authentication elements, e.g. username, password, account number, bank card number, security number, PIN number, or biometric information like fingerprint, iris scan, facial recognition or voice recognition to recognise a characteristic property in the user's voice. Other possibilities include signature recognition, handwriting recognition, or recognition of characteristic behaviour of the user like typing speed or pattern, pressure or pattern of a stylus, or mouse movement pattern. Yet further possibilities include geographic information like a current GPS fix of a mobile user terminal the user has about his or her person, or an identification of a local network the user terminal is currently connected to (e.g. the mobile terminal 132).

Further, the request comprises authentication information for authenticating the workstation itself.

At step S20, the control module 414 verifies whether the user and the source workstation are legitimate using the one or more personal authentication elements received for the user and the authentication information received for the workstation. If so, it stores the requests in its database 416 amongst one or more other similar kinds of verified requests from the service functions 402 on one or more others of the workstations 112, 116, 118c, 204 and/or 304; and/or one or more previous requests from the service function on the same workstation that originated the current request. The control module 414 may store the requests in the database 416 in the form of any suitable data structure.

The requested cash-handling operation comprises a request to either dispense cash from a cash-handling machine 202 or accept cash into a cash-handling machine 202. One or more of these may be part of a transaction to dispense cash from a customer's account, or to deposit cash into a customer's account. Transactions which involve money being transferred externally in or out of the bank (the institution as a whole) may be referred to as front-office operations. Alternatively or additionally, one or more of the requested cash-handling operations may be part of a cash-in-transit procedure to be carried out by a cash-in-transit operator, i.e. to redistribute cash between cash-handling machines 202 by taking cash from one or more of the machines 202 and putting back into one or more others of the machines 202. Operations involving money moving internally within the bank (within the institution) may be referred to as back office operations.

In embodiments, as well as storing the requests themselves, control module 414 uses the database 416 to maintain an inventory of one or more of the cash-handling machines 202. At initial set-up or at some convenient juncture like the beginning or the end of the day, the control module 414 may receive a report from each cash-handling machine 202 of its inventory and store this in the database 416. Also, the inventory will be updated whenever an operation to accept and/or dispense cash is released. This may comprise updating the inventory based on a transaction being released by the control module 414, or based on a confirmation received back from the cash-handling machine 202 when the operation is released.

In the case where a user requests a cash-handling operation from a particular specified machine 202, the control module 414 will only accept a request if the machine 202 has sufficient inventory. So in the case of a request to dispense cash, it ensures there is enough cash in the machine's cash box to service the request in question and one or more other requests pending in the database; and/or in the case of accepting cash, to ensure the machine's box is not too full to service the request and one or more others of the pending requests. In embodiments, the inventory management module 414 includes in the inventory information as to how much of what currency and/or what denominations of note or coin are currently in the machine's cash box 412. In determining whether to accept a request to be stored in its database 416, the control module may then also take into account any currency and/or note reservation (reserving particular denominations of note) specified in one or more of the requests, or specified denomination of coin, or specified condition on denomination of note or coin. E.g. the control module 414 will not release too many £50 notes if they are needed to satisfy a previously submitted request that is still pending.

At step S30 a user approaches one of the cash-handling machines 202 and uses the built-in user interface 302 (e.g. touch screen) to indicate that he or she wishes to retrieve a specified one of the transactions. The user also identifies him or herself via the user interface 302 using one or more personal authentication elements. Again these could comprise for example a username, password, account number, bank card number, security number, PIN number, biometric information, signature recognition, handwriting recognition, behavioural information, or geographic location information.

Note that the user retrieving the request is not necessarily the same user that submitted the request (though in some scenarios they may well be). For example, a customer could pre-order some cash which a member of bank staff collects on his or her behalf, or a member of bank staff could order the cash on the customer's behalf for the customer to collect, or the order and the retrieval could be performed by two different members of bank staff.

In response to the user input, the slave module 404 on the cash-handling machine 202 submits a retrieval signal via the network port 406 and network 108 of its branch to the control module 414 on the sever 114 (or via the wider network 102 if the server is the enterprise server 110). The signal identifies the specified request to be retrieved, as well as sending information on the retrieving user's one or more personal authentication elements. The signal also identifies the cash-handling machine 202 from which that signal originates, and may include authentication information for the originating machine 202.

In embodiments step S30 may comprise two sub-steps. First the user submits a signal including his or her identifier and any authentication information, and in response (assuming this is verified) the control module 4141 returns a list of one or more requests stored for that user (the user only sees his or her own requests). Second, the user then selects the desired request from the list at the interface 302 of the machine 202 and submits this selection to the control module 414. Alternatively, step S30 may be performed in a single stage if the user is given a way to identify the transaction up front, e.g. has already been supplied with a transaction number at step S10.

In further embodiments, the retrieval of the stored request (step S30) could be submitted on behalf of the machine 202 from an immediately associated teller workstation 204, i.e. a workstation adjacent the cash-handling machine 202 (but not a remote workstation 112, 116 or 132 elsewhere in the branch or outside of the branch).

At step S40, the control module 414 on the server performs an automatic conflict resolution process to arbitrate between the (potential) multiple different requests.

The control module 414 first verifies whether the one or more personal authentication elements received in the signal are legitimate, and will only allow the process to proceed on condition of this verification. The control module 414 may perform the verification by deferring to the core system 100. In the case of a customer transaction, it will also ensure the transaction is cleared by the core system 100 before releasing the transaction.

Further, the control module 414 uses the received authentication information for the originating machine itself to verify whether the signal is from a legitimate source. If a particular cash-handling machine 202 was specified in the request, the process will also only be allowed to proceed on condition that the signal was received from the specified machine 202. Otherwise as long as the originating machine is a legitimate source, the process can proceed.

Assuming the user and source are successfully authenticated, the control module 414 proceeds to release the requested operation on condition that is passes the conflict resolution.

The driver implemented in the control module 414 is has a direct relationship (over the network) with the mechanism on the cash-handling machine 202 that it is driving, and thus is aware of the current state of any operation being performed by the cash-handling machine 202. In embodiments, the control module 414 applies the conflict resolution at the controller 110 or 114 itself. In this case, the control module 414 will only release the transaction if the driver is not currently indicating a busy signal as a result of the mechanism's activity. Alternatively the conflict resolution may be performed at the machine 202 itself. Generally it will be more efficient to implement the conflict resolution the central controller 414. In some embodiments, a conflict resolution may be applied both centrally and at the individual machine as a fail-safe.

In embodiments, a conflict may only be considered to occur if two (or more) operations of the same type are attempted simultaneously, i.e. two or more request to dispense cash would conflict, and/or two or more requests to accept cash would conflict, whereas retrieving a request to dispense cash need not conflict with accepting cash or vice versa.

In alternative embodiments, the machine 202 may only be allowed to perform one cash-handling operation of any kind at once, so retrieving a request to dispense cash would be considered to conflict with accepting cash and vice versa. Further, in various embodiments a cash-handling operation may or may not be considered to conflict with another kind of document-handling operation such as processing a cheque. For example in some embodiments the machine 202 may be provided with independent accept and dispense channels, or separate cash and cheque handling channels, in which case these operations need not necessarily conflict (though in other embodiments they may do).

In further embodiments, it may be possible for the request from a user (e.g. teller or supervisor) to reserve the whole cash handling machine, and it may not be allowed to override such a reservation. For example this reservation could be made as part of a multi-stage transaction by a teller.

In yet further embodiments, as well as being prevented from conflicting with other users, a user is not allowed to retrieve a cash-handling operation that conflicts with another of that user's own previously retrieved, ongoing cash-handling operations. So e.g. a teller cannot begin dispensing the cash for a subsequent operation until the dispensing of cash for a previous transaction has been completed.

On condition the retrieval passes the conflict resolution, the control module sends an instruction back to the slave module 404 on the relevant cash-handling machine 202. At step S50 the instruction acts on the slave module 404, causing it to operate the mechanism of the cash box 412 to dispense or accept cash in accordance with the released operation. Note that the cash-handling machine 202 is preferably configured so that it cannot itself start an operation of accepting or dispensing cash, so a cash-handling operation cannot be initiated autonomously by the slave module 404 or in-built user interface 302: instead it must be instructed to do so by the control module 414.

In embodiments, once the cash-handling operation is completed, the slave module 404 may report this fact back to the control module 414 to inform future conflict resolution decisions.

Some example use cases are now discussed.

In embodiments, one or more of the workstations may take the form of a teller workstation 204. For example the cash-handling machine 202 may take the form of an island terminal or "third terminal" shared between three or more tellers (e.g. five tellers) in the same branch. The different tellers may each submit requests from their respective workstations 204 and then go up to the island terminal 202 to retrieve the request and complete the operation.

In embodiments, one or more of the workstations may take the form of a branch workstation 116 not associated with a teller (or not specifically associated with a teller. For example there may be branch workstation 116 located in one or more private meeting rooms of a branch, e.g. for meeting with high priority customers. A member of bank staff may meet with the customer in the meeting room and use the workstation 116 to reserve some amount of cash to be dispensed for the customer (potentially with a certain note reservation), then after the meeting the staff member may go out to a cash-handling machine 202 on the branch floor or another room to retrieve the transaction and dispense the required amount of cash on the customer's behalf.

In embodiments the workstation may take the form of a regional workstation 112 not associated with one specific branch. For example this may be used by a cash-in-transit operator who is pre-planning a redistribution of cash from one or more cash-handling machines 202 to one or more other cash-handling machines 202. In this case, the operator may pre-order the dispensing and accepting operations involved to redistribute the cash about between machines 202. Then when he or she arrives on site it only remains to retrieve the pre-stored operations.

In further embodiments, the workstation may take the form of a mobile workstation 132. For example a customer may run an app on his or her mobile phone or tablet, allowing him or her to pre-order a certain cash transaction, e.g. to pre-order a certain note reservation. When the user arrives at the branch, the notes or the required denomination or denominations are then available to be collected.

In yet further embodiments, the work station may take the form of an integrated workstation 304, having the cash-handling machine 202 and workstation (comprising the user interface 302) integrated into the same terminal. In this case the integrated workstation 304 is also installed with an instance of the service function 402 (not shown in FIG. 4) and can initiate dispensing or accepting of cash by the cash-handling machine 202 integrated into the same terminal. However, to avoid conflicts with potential requests from other workstations 112, 116, 118c and/or 204, and/or conflict with previously queued transactions or other operations from the same station, the service function on the integrated workstation 304 is required to submit a request to the control module 414 on the server 110 and the slave module 404 is still required to defer to the control module 414 to release the current operation in dependence on the conflict resolution process. This will also still comprise at least one stage of the user authenticating him or herself to the control module 414 via the user interface 312, and the integrated workstation 304 itself being authenticated by the control module 414.

Generally the workstations may comprise any combination of different kinds such as those exemplified above.

It is envisaged that the examples using teller workstations 204 or branch workstations 116 will be more relevant to front-office operations, i.e. external transactions customers with customers; while the examples where operations are initiated from the integrated workstation 304 itself will be more relevant to back-office operations, allowing a member of staff to move cash between boxes. Nonetheless, this is not exclusively the case, and generally speaking any of the teachings herein may be used in relation to either front or back office transactions or operations.

Further, although examples above have been described in terms of one machine 202, generally the control module 414 may be given visibility of two or more cash-handling machines 202, and to arbitrate between requests for each.

As set out above, the conflict resolution is preferably done centrally at the server 110. However, in alternative embodiments some or all of the controller functionality of the control module 414 and/or database 416 may be implemented at the cash-handling machine 202 itself.

It will be appreciated that the above embodiments have been described only by way of example. Other variants may be implemented by a person skilled in the art given the disclosure herein. The scope of the invention is not limited by the described embodiments but only by the accompanying claims.

The invention claimed is:

1. A machine for performing operations to handle physical cash and/or other physical financial documents in a mechanical manner, the machine comprising:
   a secure box having a mechanism for accepting cash and/or other physical financial documents into the box, and/or dispensing physical cash and/or other physical financial documents from the box;
   a physical network port for connecting to a controller via a network
   a slave module configured to send a first signal, submitted by a first user, to the controller for retrieving, from a data store of the controller, a list of one or more operations pre-ordered from amongst a plurality of requests stored on the data store from one or more users of one or more workstations, each request comprising a request to pre-order a respective one of said operations;
   wherein the slave module is further configured to send a second signal, submitted by said first user, to the controller for retrieving from the data store a selected one of the operations from said list; and
   wherein the slave module is further configured to receive back an instruction from the controller in response to said second signal, the instruction being to release the selected operation, and to operate said mechanism to accept or dispense the physical cash and/or other physical financial document in dependence on the instruction;

wherein the instruction to release the selected operation is in response to a determination, which determination is in response to the sending of the second signal, that another, conflicting one of said physical cash-handling operations is not currently being performed by the same machine; and wherein said machine is not an automated teller machine (ATM).

2. The cash-handling machine of claim 1, comprising a built in user interface by which the first user initiates both said first and second signal for retrieving said list of operations and said selected operation.

3. A system comprising:

at least one machine for performing operations to handle physical cash and/or other physical financial documents in a mechanical manner, the at least one machine comprising a slave module and a secure box having a mechanism for accepting physical cash and/or other physical financial documents into the box, and/or dispensing physical cash and/or other physical financial documents from the box; and a controller configured to receive requests from one or more users of the one or more workstations via a network, each request comprising a request to pre-order a respective one of said operations to handle physical cash and/or other physical financial documents in a mechanical manner;

wherein the controller comprises a data store configured to store said requests;

wherein the controller is further configured to receive, over the network, a first signal, submitted by one of the users, from or on behalf of the slave module of the at least one machine for retrieving from the data store a list of one or more operations pre-ordered by said one of the users;

wherein the controller is further configured to receive, over the network, a second signal, submitted by said one of the users, from or on behalf of the slave module of the at least one machine for retrieving from the data store a selected one of the users operations from the list;

wherein the controller is configured to process the second signal and in response to release the selected operation, the release comprising issuing an instruction to the slave module over the network controlling the at least one machine to perform the selected operation to handle the physical cash and/or other physical financial documents;

wherein the slave module on the at least one machine is configured to operate said mechanism to accept or dispense the physical cash and/or other physical financial documents in dependence on the instruction from the controller;

wherein the controller is configured to release the selected operation in response to a determination, which determination is in response to the receiving of the second signal, that another, conflicting one of said physical cash-handling operations is not currently being performed by the at least one machine; and wherein said machine is not an automated teller machine (ATM).

4. The system of claim 3, wherein the at least one machine is a cash-handling machine and each of a plurality of said operations comprises a physical cash-handling operation for accepting or dispensing physical cash, the instruction to the slave module controlling the cash-handling machine to dispense or accept physical cash in accordance with the respective physical cash-handling operation.

5. The system of claim 4, wherein the controller is further configured to simultaneously retrieve a request for an operation to dispense physical cash and a further request to accept physical cash, such that said other of the physical cash-handling operations does not conflict if the request is an operation to accept physical cash when the operation requested by said one of the requests is to dispense physical cash, nor if it is an operation to dispense physical cash when the operation requested by said one of the requests is to accept physical cash.

6. The system of claim 3, wherein said determination comprises determining at least: (i) that said other of the physical cash-handling operations conflicts if it is an operation to dispense physical cash when the operation requested by said one of the requests is also to dispense physical cash, and/or (ii) that said other of the physical cash-handling operations conflicts if it is an operation to accept physical cash when the operation requested by said one of the requests is also to accept physical cash.

7. The system of claim 3, wherein the first signal indicates an identity of the user who is initiating the first signal from the machine, and the control module is configured to release the selected operation in dependence on the identity of the user.

8. The system of claim 3, wherein the first signal comprises user authentication information of the user who is initiating the first signal from the machine, and the control module is configured to release the selected operation on condition of verifying the user of the machine who is initiating said signal.

9. The system of claim 3, wherein the controller comprises a network interface comprising a physical network port, configured to receive said requests from three or more workstations.

10. The system of claim 3, wherein:

the controller comprises a network interface, comprising a physical network port, that connects to a plurality of machines for performing operations to handle physical cash and/or other physical financial documents;

at least some of the requests specify the machine by which the respective operation is requested to be performed; and the control module is configured to release the selected operation in dependence on both said first and second signal being received from or on behalf of the slave module of the specified machine.

11. The system of claim 10, wherein:

each of the machines is a cash-handling machine and each of said operations comprises a physical cash-handling operation for dispensing or accepting physical cash;

the data store is configured to maintain a respective inventory of physical cash in each of the plurality of cash-handling machines;

at least some of the requests specifying a machine also specify a reservation of a predetermined currency and/or denomination of physical cash;

the control module is configured to compare each newly received one of the requests specifying a reservation and machine in relation to the inventory and one or more others of the requests in the data store specifying a reservation and a physical cash-handling operation by the same cash-handling machine, and to accept the newly received request in dependence on the comparison.

12. The system of claim 3, wherein the respective operations comprises a transaction to dispense physical cash to a customer or accept physical cash from a customer.

13. The system of claim 3, wherein the respective operation comprises at least a part of a cash-in-transit operation for moving physical cash between cash-handling machines.

14. The system of claim 3, wherein the respective operations comprises a multi-stage to dispense and/or accept multiple portions of physical cash.

15. The system of claim 3, wherein said one of the workstations is integrated into a same terminal as the machine.

16. The system of claim 3, wherein at least one of the workstations is a teller assisted machine.

17. The system of claim 3, wherein at least one of the workstations is a terminal separate from the machine.

18. The system of claim 17, wherein at least one of the workstations is a mobile terminal.

19. The system of claim 3, wherein the controller is further configured to simultaneously retrieve a request for a physical cash-handling operation and a further request to handle one of said other physical financial documents, such that another of the operations does not conflict if it is an operation to handle one of said other physical financial documents when the operation requested by said one of the requests is a physical cash-handling operation, nor if it is a cash-handling operation when the operation requested by said one of the requests is to handle one of said other physical financial documents.

20. A computer program product for mediating between a plurality of workstations and at least one machine for performing operations to handle physical cash and/or other physical financial documents in a mechanical manner, the computer program product comprising code embodied on a non-transitory computer-readable storage medium and being configured so as when executed to perform operations of:

receiving requests from one or more users of one or more of the workstations over a network, each request comprising a request to pre-order a respective one of said operations to handle physical cash and/or other physical financial documents in a mechanical manner;

storing said requests in a data store;

receiving over the network a first signal, submitted by one of the users, from or on behalf of a slave module of the machine for retrieving from the data store a list of one or more operations pre-ordered by said one of the users;

receiving, over the network, a second signal, submitted by said one of the users, from or on behalf of the slave module of the machine for retrieving from the data store a selected one of the operations from said list;

processing the second signal and in response releasing the selected operation, the release comprising issuing an instruction to the slave module controlling the machine to perform the selected operation to handle the physical cash and/or other physical financial documents;

wherein the releasing the selected operation is in response to a determination, which determination is in response to the receiving of the second signal, that another, conflicting one of said physical cash-handling operations is not currently being performed by the same machine; and wherein said machine is not an automated teller machine (ATM).

\* \* \* \* \*